United States Patent

Hershberger et al.

Patent Number: 5,123,032
Date of Patent: Jun. 16, 1992

[54] ANALOG "BLUE" SIGNAL DETECTOR

[75] Inventors: David L. Hershberger, Nevada City; Leon J. Stanger, Grass Valley, both of Calif.

[73] Assignee: The Grass Valley Group, Inc., Nevada City, Calif.

[21] Appl. No.: 383,279

[22] Filed: Jul. 20, 1989

Related U.S. Application Data

[63] Continuation of Ser. No. 60,273, Jun. 10, 1987, abandoned.

[51] Int. Cl.⁵ .......................................... H04L 27/06
[52] U.S. Cl. ............................. 375/75; 360/40; 375/103
[58] Field of Search ............ 375/8, 11, 12, 13, 23, 375/25, 75, 76, 103; 370/110.3, 110.4; 379/386; 333/18; 360/45, 48, 71, 73; 340/870.21

[56] References Cited

U.S. PATENT DOCUMENTS

| | | | |
|---|---|---|---|
| 3,268,824 | 8/1966 | Hinrichs et al. | 375/25 |
| 3,375,445 | 3/1968 | Salmot | 375/23 |
| 3,404,231 | 1/1969 | Aaron et al. | 375/113 |
| 3,638,183 | 1/1972 | Progler et al. | 375/76 |
| 3,706,854 | 12/1972 | Dickson et al. | 375/40 |
| 3,757,315 | 9/1973 | Birchield et al. | 375/40 |
| 3,863,030 | 1/1975 | Mills | 370/110.3 |
| 3,909,781 | 9/1975 | Krol et al. | 375/25 |
| 3,936,801 | 2/1976 | Shuman | 379/386 |
| 3,947,769 | 3/1976 | Rousos et al. | 375/76 |
| 3,953,674 | 4/1976 | Fletcher et al. | 375/103 |
| 3,978,407 | 8/1976 | Forney, Jr. et al. | 375/13 |
| 4,042,789 | 8/1977 | Richards | 379/386 |
| 4,045,620 | 8/1977 | Westbrook | 379/386 |
| 4,152,649 | 5/1979 | Choquet | 333/18 |
| 4,494,240 | 1/1985 | Payton | 375/75 |
| 4,534,043 | 8/1985 | Krishnan | 340/825.48 |
| 4,584,690 | 4/1986 | Cafiero et al. | 375/76 |
| 4,606,045 | 8/1986 | Miller | 375/13 |
| 4,626,629 | 12/1986 | Premoli et al. | 370/110.3 |
| 4,637,036 | 1/1987 | Kobari | 375/76 |
| 4,674,103 | 6/1987 | Chevillat et al. | 375/13 |

OTHER PUBLICATIONS

Bell Communications Research, "Alarm Indication Signal Requirements and Objectives", Issue May 1, 1986, Technical Reference TR-TSY-000191.
Motorola Linear/Interface Devices, MC1330A1-/MC1330A2P "Low-Level Video Detector" Silicon Monolithic Integrated Circuit.

Primary Examiner—Stephen Chin
Attorney, Agent, or Firm—Francis I. Gray; John Smith-Hill

[57] ABSTRACT

An analog "blue" signal detector detects when the amplitude of a spectral component of an input signal associated with a blue signal exceeds a given level for a predetermined period of time to provide an indication that the blue signal is present. When the blue signal is removed, the indication is rapidly removed also.

23 Claims, 3 Drawing Sheets

ANALOG "BLUE" SIGNAL DETECTOR

This is a continuation of application of Ser. No. 060,273 filed Jun. 10, 1987 and now abandoned.

BACKGROUND OF THE INVENTION

The present invention relates to fault detection, and more particularly to an analog "blue" detector for identifying a fault signal at a downstream location in a digital telecommunications system from the fault.

In a digital telecommunication network, such as a common carrier telephone system, a hierachy of digital signals includes variously defined frequency formats, such as a DS3 45 Mbit signal, for the transmission of digital information. An alarm signal is used to transmit downstream in the digital network the information that a system failure has been detected. The alarm signal is variously called an Alarm Indication Signal (AIS), an Alarm Inhibit Signal, a Keep Alive Signal or a Blue Signal as is described in Bell Communications Research Technical Reference TR-TSY-000191 "Alarm Indication Signal Requirements and Objectives". The purpose of the AIS is to inhibit the generation of unproductive and possibly misleading alarms downstream from the source of the failure, and to active status indications and to modify carrier alarm reports so that the location of a failure may be more readily ascertained. For the DS3 format the AIS is a DS3 signal with information bits set to alternating ones and zeros with the bit following the control bit of each block in the M frame being a one. The framing bits are set for valid framing, the parity bits are set to indicate parity, the two X bits are set to be the same, and the stuff indicator bits are set to zeros giving what is called "stuck stuffing".

In order to make use of the ASI it is necessary to detect when such a signal is present. Digital techniques entail complete decoding, clock recovery, frame detection, etc. of the DS3 signals. This results in a complex circuit for detecting a signal which occurs relatively rarely. What is desired is a simple circuit for detecting the ASI without the need for complete decoding of the DS3 signals.

SUMMARY OF THE INVENTION

Accordingly the present invention provides an analog "blue" signal detector which looks for spectral lines in an input digital signal characteristic of a blue signal. The input digital signal is input to a bandpass filter centered about the characteristic spectral content of the blue signal. The output of the bandpass filter is input to an envelope detector to generate a D.C. level. The D.C. level is input to a slow attack/fast decay network to provide an output indication of the presence of the blue signal when a given level is exceeded.

The objects, advantages and novel features of the present invention will be apparent from the following detailed description when read in conjunction with the appended claims and attached drawing.

DESCRIPTION OF THE PREFERRED EMBODIMENT

Figure 1:
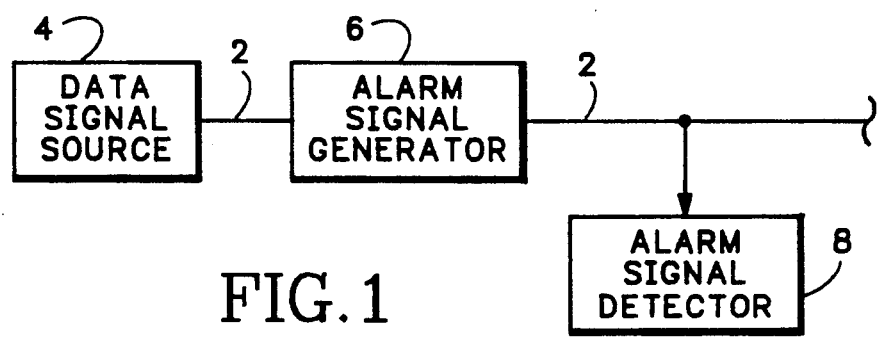
FIG. 1 illustrates schematically part of a telecommunication network, including an analog "blue" signal detector and a serial communication path.
Figure 2:
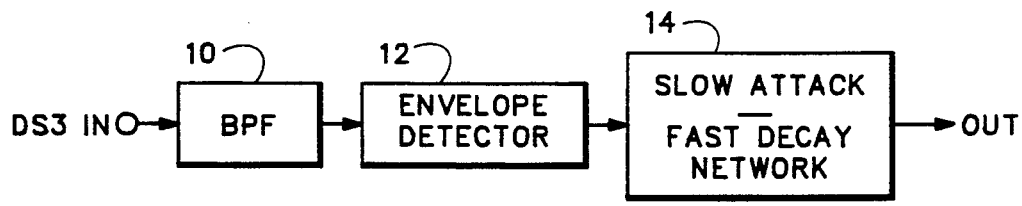
FIG. 2 is a block diagram view of a simple analog blue signal detector according to the present invention.

Referring now to FIG. 1 a digital communication network includes a serial communication path 2, a data source 4 for impressing an input digital signal in the DS3 serial signal format on the serial communication path, an alarm signal generator 6 for applying a blue signal to the serial communication path, and an analog blue signal detector 8. In a simple form, shown in FIG. 2, detector 8 comprises a bandpass filter 10 centered at a frequency which is characteristic of a blue signal. The detected spectral line from the bandpass filter 10 when the blue signal is present is input to an envelope detector 12. The output of the envelope detector 12 is input to a slow attack/fast decay network 14. Since a signal pattern similar to the blue signal may occur occasionally during a normal DS3 signal, an indication of the blue signal is desired only if the pattern is present for a predetermined period of time. If the blue signal is present long enough, a logic output signal from the slow attack/fast decay network 14 indicates such presence. When the blue signal is removed the logic output signal from the slow attack/fast decay network 14 quickly changes from a blue signal present indication to a normal signal indication. This simple version detects a single spectral line or a number of closely spaced spectral lines. The filter may be a crystal filter, a ceramic resonator, LC or the like.

Figure 3:
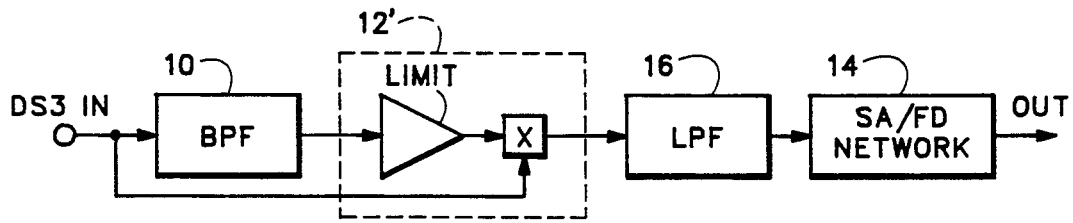
FIG. 3 is a block diagram view of a quasi-synchronous analog blue signal detector according to the present invention.
Figure 4:
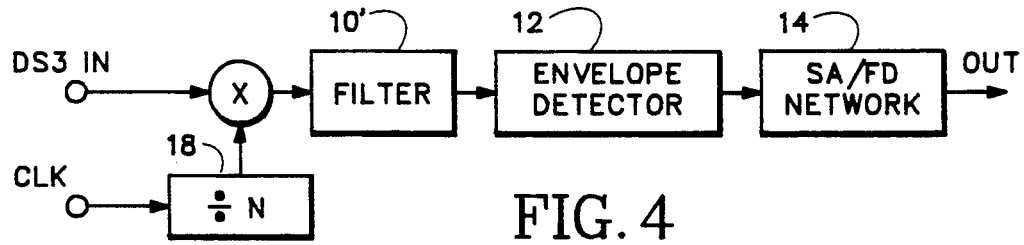
FIG. 4 is a block diagram view of a synchronous analog blue signal detector according to the present invention.

For quasi-synchronous operation as shown in FIG. 3 the frequency selectivity is distributed between the bandpass filter 10 and a lowpass filter 16 at the input and output, respectively, of the envelope detector 12'. The synchronous version of FIG. 4 requires a clock input CLK which is divided by N by a divider 18. The CLK/N is mixed with the input signal and input to the input filter 10' which may be either a bandpass filter or a lowpass filter. The synchronous version can detect closely spaced spectral lines or spectral lines which are slightly displaced from integer submultiples of the DS3 input clock. Further, several detectors for several different spectral lines may be ANDed together for enhanced reliability.

Figure 5A:
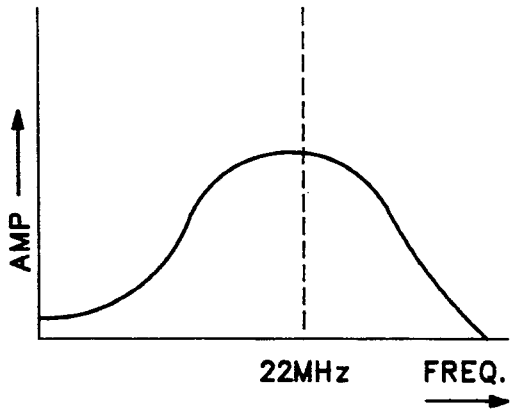
FIG. 5A is a graphic view of the frequency spectrum for a normal digital input signal.
Figure 5B:
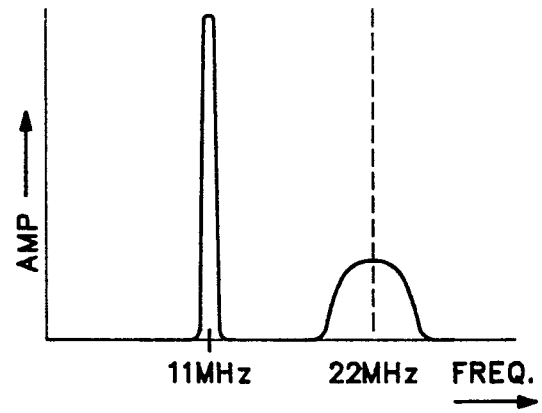
FIG. 5B is a graphic view of the frequency spectrum for a blue signal.

As shown on FIGS. 5A and 5B in normal communications the DS3 signal at the input has a frequency spectrum centered around one-half the DS3 clock rate, or 22 MHz. However, when there is an upstream communications error the blue signal is generated which has a pronounced frequency spectrum component centered at 11 MHz. There still exists also a component centered at 22 MHz, but this component is much weaker trhat the component centered at 11 MHz.

Figure 6:
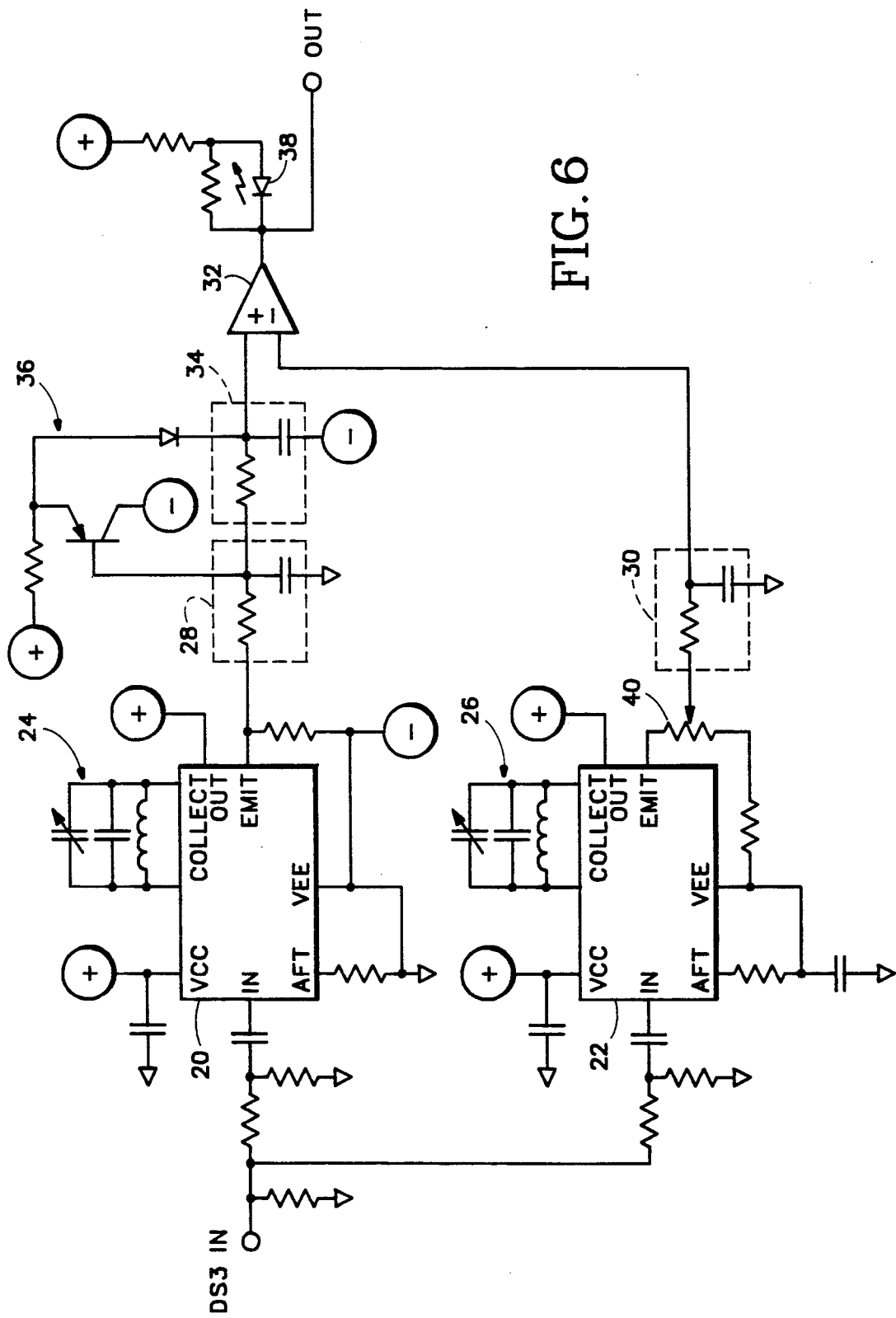
FIG. 6 is a schematic diagram view of analog blue signal detector according to the present invention.

Referring now to FIG. 6 the DS3 input signal is input via appropriate impedance matching impedances to two tuned frequency envelope detectors 20, 22, such as MC1330 s by Motorola Inc. The first detector 20 is tuned to the blue signal frequency, i.e., 11 MHz, by a first adjustable LC tank circuit 24 connected to the tank terminals, and the second detector 22 is tuned to 22 MHz by a second adjustable LC tank circuit 26 connected to its tank terminals. The emitter outputs of the detectors 20, 22 are connected to respective lowpass RC filters 28, 30. The output of the second lowpass filter 30 is input to the inverting input terminal of a comparator 32. To provide a slow attack when a blue signal is present, a long time constant RC circuit 34 is connected in series with the output of the first lowpass filter 28 and the output of the long time constant RC circuit is connected to the noninverting input terminal of the comparator 32. A fast off circuit 36 is connected in parallel with the long time constant RC circuit 34. The output of the comparator 32 is a logic output signal indicating the presence or absence of the blue signal. The output of the comparator 32 also serves to drive an LED 38 to present a visual indication of the presence of the blue signal.

In operation the respective tuned circuits 24, 26 are tuned to the appropriate frequencies and the comparison level from the second detector 22 is adjusted via a level resistor 40 between the emitter output and the second lowpass filter 30. When a valid DS3 signal is present, the amplitude of any frequency component at 11 MHz is much less than that at 22 MHz and the output of the second detector 22 is more positive than the output of the first detector 20. The output of the comparator 32 is a positive logic level, holding the LED 38 cut off, indicative of the presence of a valid DS3 signal. When the blue signal is present, then the amplitude of the frequency component at 11 MHz is greater than that at 22 MHz and the output of the second detector is more negative than the output of the first detector. However, due to the RC time constant circuit 34 this change in the output of the first detector 20 is not input immediately to the comparator 32. When the capacitor of the RC time constant circuit 34 charges to a voltage greater than that at the output of the second detector 22, then the output of the comparator 32 changes from a positive logic level to a negative level indicating the presence of the blue signal. Also the LED 38 is biased on to provide a visual indication of the blue signal presence. The transistor of the fast off circuit 36 provides a fast discharge path for the capacitor of the RC time constant circuit 34 when the blue signal is removed and the normal DS3 signal returns so that the output of the comparator 32 switches logic level from negative to positive virtually instantaneously with the removal of the blue signal.

Thus the present invention provides an analog "blue" signal detector by comparing the amplitude of the spectral line corresponding to the blue signal with the amplitude of the spectral line corresponding to a normal signal to provide an indication of the presence of the blue signal.

What is claimed is:

1. Analog apparatus for detecting the presence of a specific digital signal having a characteristic frequency on a serial communication path, comprising:

analog bandpass filter means having an input terminal connected to the serial communication path for receiving a digital signal on the serial communication path, the analog bandpass filter means blocking spectral components of frequency substantially different from said characteristic frequency and passing a spectral component having said characteristic frequency, whereby the analog bandpass filter means provides an output signal that represents the component of the digital signal on the serial communication path at said predetermined dominant frequency; and means for comparing the amplitude of the output signal of the analog bandpass filter means with a variable threshold level that depends on the digital signal and providing an indication that the specific digital signal is present on the serial communication path.

2. Analog apparatus for detecting the presence of a specific digital signal on a serial communication path, comprising:

an analog bandpass filter having an input terminal connected to the serial communication path, the bandpass filter being centered about a frequency that is characteristic of the specific digital signal, to output a spectral component of a digital signal being propagated on the serial communication path;

means for detecting the envelope of the spectral component from the bandpass filter; and means for comparing the envelope with a given level to provide an indication of the presence of the specific digital signal after the specific digital signal has been present on the serial communication path for a predetermined period of time.

3. Apparatus according to claim 2, wherein the comparing means comprises means for rapidly removing the indication when the specific digital signal is no longer present on the serial communication path.

4. Apparatus according to claim 2, further comprising a lowpass filter between the output of the detecting means and the input of the comparing means to convert the envelope to a d.c. level for comparison with the given level.

5. An analog method for detecting the presence of a specific digital signal on a serial communication path, comprising the steps of:

separating a first spectral line representing normal digital data on the serial communication path and a second spectral line representing the specific digital signal on the serial communication path using analog means;

comparing the amplitude of the first spectral line with the amplitude of the second spectral line; and indicating the presence of the specfic digital signal on the serial communication path when the amplitude of the second spectral line is greater than the amplitude of the first spectral line.

6. A method according to claim 5, wherein the indicating step comprises the step of outputting an indicator, for the presence of the specific digital signal when the amplitude of the second spectral line exceeds the amplitude of the first spectral line for a predetermined period of time.

7. A method according to claim 6, further comprising the step of immediately removing the indicator when the specific digital signal is no longer present on the digital communication path.

8. A method according to claim 5, wherein the step of separating said first spectral line and said second spectral line comprises applying the signal on the serial communication path both to a first bandpass filter whose center frequency is equal to the dominant frequency of normal digital data on the serial communication path and to a second bandpass filter whose center frequency is substantially different from the center frequency of the first bandpass filter.

9. An analog method of detecting the presence of a specific digital signal on a serial communication path, comprising the steps of:
   analog bandpass filtering a digital data signal on the serial communication path about a frequency that is characteristic of the specific digital signal to produce a filtered signal;
   detecting a d.c. level for the filtered signal; and
   indicating the presence of the specific digital signal when the d.c. level exceeds a variable threshold level that depends on the digital signal.

10. A method according to claim 9, wherein the indicating step comprises the step of outputting an indicator for the presence of the specific digital signal when the d.c. level exceeds the predetermined threshold for a predetermined period of time.

11. A method of operating a digital telecommunication network, comprising:
   (a) propagating digital data in serial form over a communication path in accordance with a predetermined signal format such that in normal operation the signal has a first dominant frequency,
   (b) generating an alarm signal in the event of a fault in the digital telecommunication network and propagating the alarm signal over the communication path, the alarm signal being in accordance with said predetermined signal format but having a second dominant frequency that is substantially different from said first dominant frequency, and
   (c) indicating the presence of the alarm signal by generating a signal representative of the amplitude of the spectral component at the second dominant frequency and comparing the amplitude of the spectral component at the second dominant frequency with a threshold level.

12. A mehtod according to claim 11, wherein step (c) comprises applying the signal being propagated over the communication path to an analog bandpass filter having a high impedance at said first dominant frequency and a low impedance at the second dominant frequency.

13. A method according to claim 12, wherein the analog bandpass filter generates a signal representative of the amplitude of the spectral component at the second dominant frequency, and the method further comprises detecting the envelope of the output signal of the bandpass filter.

14. A method according to claim 11, wherein step (c) comprises applying the signal on the communication path to a first analog bandpass filter having a high impedance at the first dominant frequency and a low impedance at the second dominant frequency, applying the signal on the communication path to a second analog bandpass filter having a low impedance at the first dominant frequency and a high impedance at the second dominant frequency, and comparing the output signal of the first analog bandpass filter with the output signal of the second analog bandpass filter.

15. A method according to claim 14, comprising generating a first envelope signal representative of the envelope of the output signal of the first bandpass filter and a second envelope signal representative of the envelope of the output signal of the second analog bandpass filter.

16. A method according to claim 15, comprising charging a capacitor with the first envelope signal so long as the first envelope signal exceeds a predetermined threshold value and discharging said capacitor when the first envelope signal is below the predetermined threshold value, and comparing the voltage of which the capacitor is charged with the second envelope signal.

17. A digital telecommunication network comprising a serial communication path, means for impressing digital data in accordance with a predetermined signal format on the serial communication path, the signal format being such that for normal digital data the signal has a first dominant frequency, and for impressing an alarm signal on the serial communication path in the event of a fault in the digital telecommunication network, the alarm signal being in accordance with said signal format but having a second dominant frequency that is substantially different from said first dominant frequency, and alarm detector means for detecting the presence of the alarm signal on the serial communication path, said alarm detector means comprising analog filter means for generating a signal representative of the amplitude of the spectral component at the second dominant frequency and means for comparing the amplitude of said spectral component with a threshold level.

18. Apparatus according to claim 17, wherein the analog filter means comprises a bandpass filter and the apparatus further comprises means for detecting the envelope of the output signal of the bandpass filter.

19. A telecommunication network according to claim 17, wherein the alarm detector means comprises a first bandpass filter having a high impedance at the first dominant frequency and low impedance at the second dominant frequency, a second bandpass filter having a low impedance at the first dominant frequency and a high impedance at the second dominant frequency, and means for comparing the output signal of the first bandpass filter with the output signal of the second bandpass filter.

20. A telecommunication network according to claim 19, wherein the means for comparing the output signal of the first bandpass filter with the output signal of the second banpass filter comprises a first envelope detector for detecting the envelope of the output signal of the first bandpass filter, a second envelope detector for detecting the envelope of the output signal of the second bandpass filter, and means for comparing the amplitude of the output signal of the first envelope detector with the amplitude of the output signal of the second envelope detector.

21. A telecommunication network according to claim 20, comprising a capacitor, a charging network for charging the capacitor so long as the output signal of the first envelope detector exceeds a predetermined threshold value, a discharging network for discharging the capacitor when the output signal of the first envelope detector is below the threshold value, and a comparator for comparing the voltage to which the capacitor is charged with the output signal of the second envelope detector.

22. Analog apparatus for detecting the presence of a specific digital signal having a characteristic frequency on a serial communication path, comprising:
   analog bandpass filter means having an input terminal connected to the serial communication path for receiving a digital signal on the serial communication path, the analog bandpass filter means blocking spectral components of frequency substantially different from said characteristic frequency and passing a spectral component having said characteristic frequency, whereby the analog bandpass filter means provides an output signal that represents the component of the digital signal on the serial communication path at said predetermined dominant frequency;

means for comparing the amplitude of the output signal of the analog bandpass filter means with a threshold level;

means for providing an indication of the presence of the specific digital signal when the output signal of the analog bandpass filter means has exceeded the threshold level for a predetermined period of time; and means for rapidly removing the indication when the output signal of the analog bandpass filter means ceases to exceed the threshold level.

23. An analog method of detecting the presence of a specific digital signal on a serial communication path, comprising the steps of:

analog bandpass filtering a digital data signal the serial communication path about a frequency that is characteristic of the specific digital signal to produce a filtered signal;

setecting a.d.c. level for the filtered signal;

outputing an indicator for the presence of the specific digital signal when the d.c. level has exceeded a predetermined threshold for a predetermined period of time; and immediately removing the indicator when the specific digital signal is no longer present on the serial communication path.

* * * * *

UNITED STATES PATENT AND TRADEMARK OFFICE
CERTIFICATE OF CORRECTION

PATENT NO.  : 5,123,032
DATED       : June 16, 1992
INVENTOR(S) : David L. Hershberger, et al It is certified that error appears in the above-indentified patent and that said Letters Patent is hereby corrected as shown below:

```
Col 4 Claim 6, line 54 delete ","
Col 5 Claim 12, line 38 "method" misspelled Col 6 Claim 16, line 4, change "of" to "to"
      Claim 19, line 32, insert "a" before "low"
      Claim 20, line 42, "bandpass" misspelled Col 8 Claim 23, line 7, insert "on" after "signal"
      Claim 23, line 11, "setecting" should be "detecting"
      Claim 23, line 12, "outputting" misspelled
```

Signed and Sealed this

Second Day of November, 1993

Attest:

BRUCE LEHMAN

Attesting Officer

Commissioner of Patents and Trademarks